Figure 6:
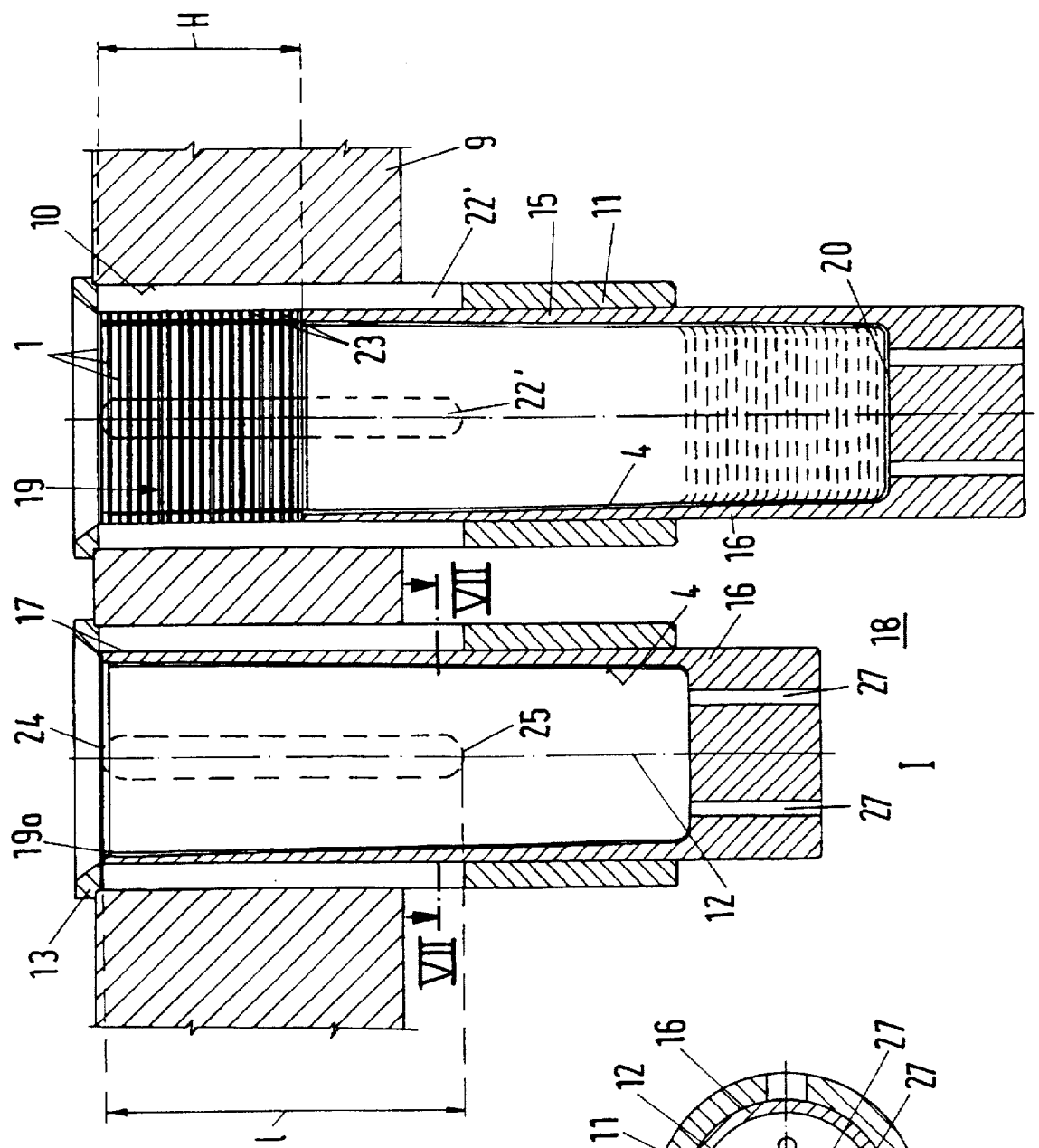

United States Patent [19]

Ruh

[11] Patent Number: 5,797,720
[45] Date of Patent: Aug. 25, 1998

[54] DEVICE FOR PRODUCING A STACK OF CUP-SHAPED RECEPTACLES FITTED IN ONE ANOTHER

[75] Inventor: Michael Ruh, Heusenstamm, Germany

[73] Assignee: Tetra Laval Holdings & Finance S.A., Switzerland

[21] Appl. No.: 894,275
[22] PCT Filed: Jan. 26, 1996
[86] PCT No.: PCT/EP96/00316
§ 371 Date: Jul. 30, 1997
§ 102(e) Date: Jul. 30, 1997
[87] PCT Pub. No.: WO96/23718
PCT Pub. Date: Aug. 8, 1996

[30] Foreign Application Priority Data

Feb. 1, 1995 [DE] Germany .......... 195 03 039.7

[51] Int. Cl.6 .......................................... B65G 57/16
[52] U.S. Cl. .......... 414/788.2; 53/408; 53/529; 414/790.3
[58] Field of Search ............... 414/788.2, 788.3, 414/790.3, 795.5, 793, 788; 53/408, 540, 541, 531, 438, 529

[56] References Cited

U.S. PATENT DOCUMENTS

| | | | |
|---|---|---|---|
| 1,238,895 | 9/1917 | Dempsey | 414/795.5 |
| 3,499,063 | 3/1970 | Ninneman et al. | 414/788.2 |
| 3,869,042 | 3/1975 | Floyd et al. | 414/788.2 |
| 4,134,892 | 1/1979 | Sundberg | 53/529 |
| 4,765,791 | 8/1988 | Brandt et al. | 414/788 |
| 4,817,365 | 4/1989 | Yawberg et al. | 53/438 |
| 5,155,971 | 10/1992 | Zopf | 53/408 |
| 5,484,254 | 1/1996 | Schiffelholz | 414/788.2 |

*Primary Examiner*—Karen M. Young
*Assistant Examiner*—Gregory A. Morse
*Attorney, Agent, or Firm*—Paul & Paul

[57] ABSTRACT

The device described here is for manufacturing a stack of cup-shaped containers coaxially inserted inside another, each with a side wall, on one end of which a base is arranged, and on the other end a flange (1), wherein the container is composed of a flexible material and the flange (1) is substantially stiffer than the side wall and the base. In order that cup-shaped containers which, from a geometrical viewpoint can only be stacked one inside another in small numbers, can be combined to form longer stacks of at least 20 containers it is provided according to the invention that in the end plate (9) of a gas-tight housing (8) there is arranged, in a driveable manner, at least one cup-shaped cavity (16) intermittently moveable in the longitudinal direction (12) of the latter up to a maximum lift (h) which is equal to the maximum height of the flange area of the container stack, that the aperture of the cavity (16) is configured and arranged for level receipt and installation of the flange (1) of the first, outer container of the stack, and in the initial position (I) before the first movement is arranged in the area of the end plate (9), accessible from outside the housing (8), while the base of the cavity (16) located opposite the aperture is arranged facing towards the internal space (18) of the housing (8), and that in the internal wall (15) of the housing (8) at least partially surrounding the cylindrical external surface of the cavity (16) there is provided at least one gas outlet channel (22'), which connects the space (23) around the external surface of the container stack to the internal space (18) of the housing.

11 Claims, 3 Drawing Sheets

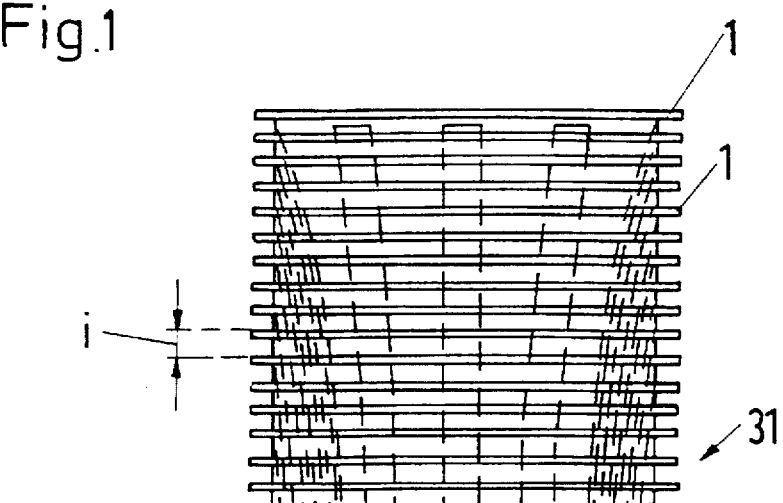
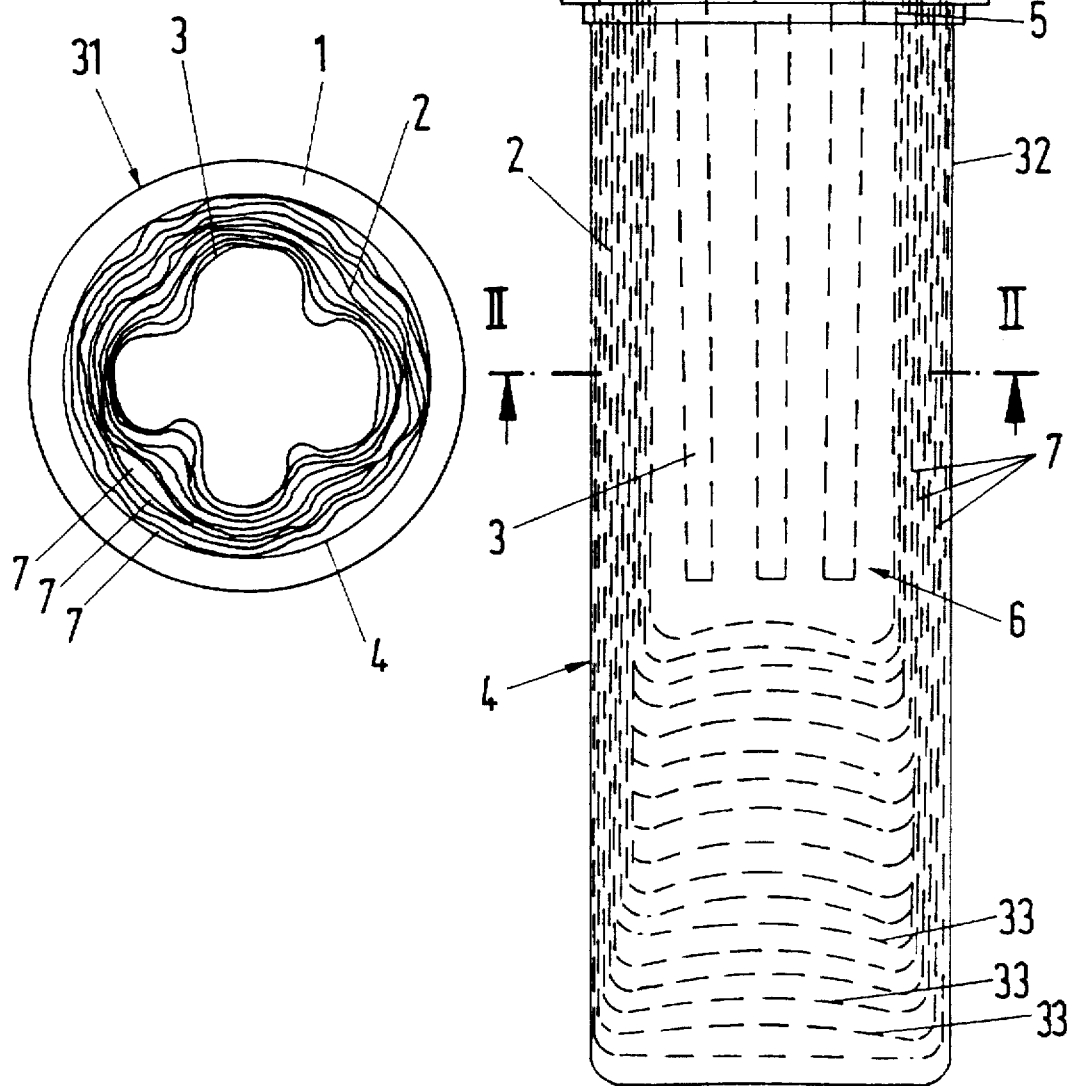

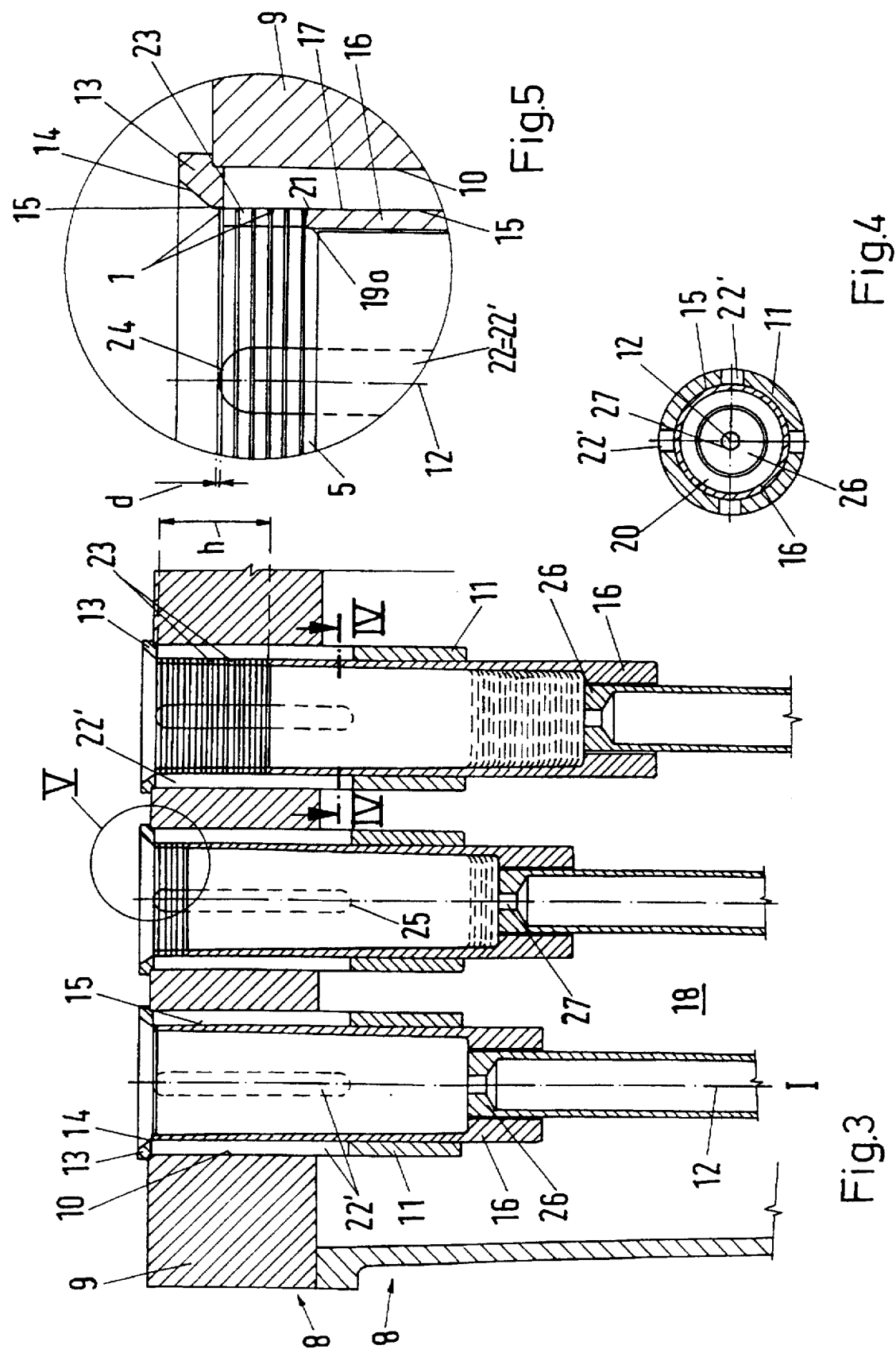

DEVICE FOR PRODUCING A STACK OF CUP-SHAPED RECEPTACLES FITTED IN ONE ANOTHER

The invention relates to a device for manufacturing a stack of cup-shaped containers inserted one inside another, each with a side wall, on one end of which a base is arranged, and on the other end a flange, wherein the container is composed of a flexible material and the flange is substantially stiffer than the side wall and the base.

Stacks of empty disposable cups are known which are inserted coaxially one inside another and are transported either for filling or to the end-user. These stacks of containers inserted one inside another are either de-stacked at high speed in a filling machine, or removed singly by the end-user, often from a specially constructed container dispenser.

Cup-shaped containers for insertion one inside another and forming a stack had, until now, to keep to certain geometrical configurations and sizes, in particular they had to have conical walls of a generally truncated-conical shape and have a collar and a rigid flange in the wall adjacent to the open end of the container, on the one hand for allowing the containers to be taken hold of and manipulated for stacking, and on the other hand for de-stacking of said containers.

The length and density of the packaging in stacks of known containers fitted one inside another depends inter alia upon the length of the cup-shaped container, upon the thickness of its walls, and upon the cone angle or angle of taper of the side wall of the container. These known containers can be fitted one inside another and combined into a stack only until the conical walls are solidly and tightly folded. In most cases the collar described is necessary for keeping the cup-shaped containers fitted one inside another at a sufficient distance apart from one another and thereby to prevent one container wedging into the next one, causing them to stick together and jam due to friction. By means of a sufficiently large collar, such a stack can be better taken apart and the individual cup-shaped containers can be better de-stacked or better dispensed in a dispenser. It has been shown that the transport and space requirements, as well as the costs, are higher the less dense the stack, the greater the distance from one flange of the container to the other flange of the next container, and thus the greater the spacing of the stack, and the smaller the cone angle of the side wall of the container.

For this reason, it has already been attempted to reduce the distance apart from one another of known containers in a stack, and a limit encountered of a minimum distance apart of the containers from one another amounting to approximately 5% of the total length of the cup-shaped container. This means that a substantial part of the transported volume is air in between the cup-shaped containers in the stack, making a minimum of storage space unavoidable.

Other hollow spaces such as, for example, food or drink cans have a 0 cone angle or have, in other words, a cylindrical side wall, so they are not stackable. During transport and storage of such containers there are therefore additional costs required for the transport of the empty containers as in addition to the material for the containers, a comparatively large amount of weight in transport means per se has to be moved. In order to avoid this, production plants for such cup-shaped containers have been located near to food processing and to filling areas. This represents undesirable secondary conditions, which could be avoided if cup-shaped containers with different geometrical designs could be combined into a stack and separated therefrom.

A further category of hollow containers are foldable or collapsible bags which are manufactured from a plastics material or from paper and are folded flat and are transported in this folded or collapsed form. Such containers again require a complex and expensive apparatus for unfolding and erecting them in a filling machine. Furthermore, they often have creases caused by being laid flat one on top of another and stacking, and by the geometry necessary for transportation as a result of this, and when they are erected they often have a distorted or twisted shape.

Containers made from flexible plastics material with a stiff flange are not stackable using the means of the known technologies. As soon as it is attempted to fit them one inside another, they crumple.

In order to provide a stack similar to the type described in the introduction, it has already been attempted to create a drop in pressure between the inside and the outside of the side wall of such a cup-shaped container, and to place the container on a mandrel so that it is easier to manipulate, for example so it can be moved into a holder for forming a stack. The cup-shaped containers made from flexible material can indeed be more closely fitted one inside another in this way, because the side walls of the containers can be folded and combined in a corrugated manner so that a kind of crumple zone forms in the region of the side wall of the container currently being stacked. However, there is a desire to further improve stack formation and to produce stacks with an even greater number of containers.

The object of the invention is therefore to provide a device for manufacturing a stack according to the type described in the introduction, with which cup-shaped containers which, from a geometrical point of view, can only be stacked one inside another in small numbers, for example three to four containers, can be combined into longer stacks of at least 20 containers.

This object is solved according to the invention in that in the end plate of a gas-tight housing there is arranged, in a driveable manner, at least one cup-shaped cavity, intermittently moveable in the longitudinal direction of said housing up to a maximum of lift which is equal to the maximum height of the flange area of the container stack, that the aperture of the cavity is configured and arranged for flush level receipt and arrangement of the flange of the first, outer container of the stack, and in the initial position, before the first movement, is arranged in the area of the end plate, accessible from outside the housing, while the base of the cavity located opposite the aperture is arranged facing towards the internal space of the housing, and that in the internal wall of the housing at least partially surrounding the external surface of the cavity, there is provided at least one gas outlet channel which connects the space around the external surface of the container stack with the internal space of the housing. In addition to the measures already undertaken to improve the parts of a stacking device operating internally, that is to say configuration of the mandrel in a particular manner in order to draw the containers made from flexible material onto it and thereby to be able to manipulate it more easily, according to the invention improvements to the holder, that is to say to the housing and to the dynamically effective parts connected to it have been undertaken in order to also exert an influence from the outside upon the container currently to be stacked, and to form stacks with a larger number of containers and with the smallest possible overall external diameters.

The holder for the stack is, according to the invention, the housing, one side of which is described as the end plate. The housing is, according to the invention, configured to be gas-tight in the sense that between the interior of the housing and the space outside said housing a pressure differential can be created. For the purposes of explanation and only by way of an example, it is assumed that inside the housing there is low pressure and outside said housing it is assumed, for clarity, that there is atmospheric pressure. In accordance with the proposal according to the invention, the end plate of the housing contains a cup-shaped cavity which can be moved intermittently relative to the end plate in the longitudinal direction of the cavity. The cavity is for receiving the stack, that is to say for receiving the first, outer cup-shaped container made from flexible material and all the following containers until a pre-determined maximum length of containers is reached where the flange area then reaches the maximum height, which is equal to the lift of the moveable cavity.

The cavity itself has the form of a cup, that is to say has an aperture on one side and a base on the opposite side. The aperture is configured such that the flange of the first, outside container in the stack is received and can be arranged at flush level. The side walls and base of the container made from flexible material are inserted into the interior of the cavity, and the flange of the container lies flush on the aperture of the cavity, that is to say before the first movement of the cavity its aperture is located in the area of the end plate of the housing such that the cavity aperture is accessible from outside the housing, in order to receive a container to be stacked and in particular for placing the flange on the aperture. The base of the cavity is inside the interior space of the housing. For reasons of clarity, the charging of the cavity with the containers to be stacked can be imagined as being from above, so the end plate is located at the top of the housing and one container made from flexible material after another is inserted from above into the cavity.

In the internal wall of the housing surrounding the cavity a gas outlet channel is fitted in order to bring the low pressure from the interior of the housing to the exterior surface of the housing stack. In this way any air present outside the currently stacked containers is extracted and transported away such that the first, outside container in the stack lies very closely to the internal wall of the cavity and the respective next container lies closely on the adjacent outside container. Air present between the folds formed in the side walls of the containers to be stacked is extracted in this way, so that the side walls can lie more closely on each other and better stacking of the containers is possible.

In an advantageous further embodiment of the invention, the interior wall of the housing surrounding the cavity is formed by a guide bush fixed in a sealing manner in a hole in the end plate, and extending from the end plate into the interior of the housing, and is provided with the gas outlet channel. The manufacturing of the device according to the invention is substantially simplified in this way. Numerous holes can be arranged adjacently in an end plate such that correspondingly numerous cavities can be installed, with the result that a corresponding number of stacks of containers can be produced. The guide bush, generally cylindrically configured, can, for example, be provided on the side facing the outside of the housing with a flange which forms a good fit, possibly also a close fit or good seal, with the end plate of the housing. The fixing of the guide bush in the end plate is done, for example by shrinking, gluing or the like. The cavity in turn sits in a relatively loose fitting manner in the guide bush, the only purpose of which is to guide the cavity and which does not have to provide a seal.

The cross-section of both the cup-shaped container and the external surface of the cavity, and accordingly that of the internal wall of the housing surrounding the external surface of the cavity, can be of different shapes. For example, it is advantageous according to the invention when the external surface of the cavity and of the at least partially surrounding internal wall are circular, oval or polygonally shaped in cross-section in accordance with the flange shape of the container. In the case of circular containers, the external surface of the cavity is cylindrical and as a result its cross-section is circular. However, an oval or otherwise roundly configured cross-section can be used. Successful tests have already been carried out with devices, the cup-shaped containers of which, and correspondingly the external surface of the cavity and the internal wall of the housing, have a polygonal shape with rounded ends/corners; or square parts and the like.

The forming of the gas outlet channel can also be simplified when a guide bush is used.

According to the invention, it is advantageous, for example, when the gas outlet channel is formed by a suction groove closed towards the outside of the housing, extending in the longitudinal direction of the cavity. By means of the coaxial arrangement of the cavity in the guide bush, both parts have the same longitudinal axis. If, to improve clarity, the end plate is assumed as being on the top of the housing, the holes in the end plate are located at the top, and the containers to be stacked, made from flexible material, are inserted into the cavity from the top, that is to say from outside the housing, to the bottom. This is done in the longitudinal direction of the cavity. The cavity is also intermittently moveable or can be indexed in said longitudinal direction, towards the inside of the housing. It is therefore advantageous when the suction groove also extends in the longitudinal direction of the cavity. It is preferred that large gas passage cross-sections are provided for the gas outlet channel and for this purpose, for example, two, three or four suction grooves are fitted, evenly distributed around the periphery of the guide bush. The suction groove has to begin close under the end of the guide bush on the outside of the housing and extend towards the inside of the housing. The suction groove runs (or the suction grooves run) approximately parallel in the flange area of the stack of containers. It is precisely from this external surface that the air can be and must be extracted. In general the "gases" described above are air. It is also preferable that the air is extremely finely filtered. It therefore receives a kind of pre-sterilisation in order to satisfy the hygiene requirements for cup-shaped containers in which foodstuffs have to It is further advantaged.

It is further advantageous according to the invention when the internal contour of the cavity corresponds to the external contour of the first, outer container in the stack. In general all the cup-shaped containers made from flexible material, for example from plastics, have the same external contour. Any deviations would only be to the extent that the shape of the side walls of the cup-shaped container is somewhat different to the next one because of the folding in of longitudinal folds. Clearly, the cup-shaped containers arranged further inside are more highly folded, whereas, for example the first, outermost container inserted in the cavity lies largely flat on the cup-shaped internal surface of the cavity. It is therefore advantageous when the internal contour of the cavity also corresponds to that of the container to be stacked when it is in its unfolded state, for example when the cup-shaped container is at least partially filled.

The evacuation cross-section of the gas outlet channel, in particular the cross-section of the suction groove in the guide bush enlarges according to the width of the suction groove. The latter is closed with respect to the outside of the housing, as described above. Towards the inside of the housing, the suction groove does not need to have a terminal edge with some embodiments, that is to say it can be open towards the inside of the housing.

It is further advantageous according to the invention when the length of the suction groove towards the inside of the housing is at least equal to the maximum height of the flange area of the container stack. The suction groove is then long enough to extract sufficient gas or air from the whole external flange area of the containers to be stacked in the interior of the housing. In this way the close contact of the side walls of the containers within a stack is obtained and thereby the desired configuration of long stacks of at least 20 containers, even though the actual geometrical configuration of the containers permits almost no stacking without folds. With some embodiments using the measures according to the invention stacks of 25 containers were obtained, with other embodiments even 30 and 50 containers.

With a special embodiment, the container made from flexible material (from plastics) had a length of 145 mm. At the open end of this cup-shaped container the internal diameter was 48 mm, while the flange diameter was 53 mm externally. The diameter of the base of this container was 44 mm. Tests were also carried out with containers with a length of 250 to 300 mm. The device for stacking according to the invention is mainly directed, with particularly good results, to long, slim containers. The wall thickness of such a containers is 80μ in a special example. However, containers have already been made according to the invention whose wall thickness is in the region of 20μ to 30μ. The upper limit of the embodiments used previously as examples was, for the thickness of the side wall of the cup shaped container, in the region of between 200μ to 300μ. The thickness of the flange was 1.2 mm.

A flexible but thick, solid plastics material is selected as the material for such cup-shaped containers, wherein good results can be obtained with polyolefin-based plastics, also with paper coated with polyolefin, further with softened PVC, with polyamides, or generally with thermoplastic materials.

The number of pieces in a container stack varies from, for example, ten cup-shaped containers up to approximately 50 cup-shaped containers.

With a preferred embodiment of the device according to the invention, the width of the suction groove was selected as 10 mm. It is then advantageous when, in the case of a suction groove also closed inside the housing, its inside terminal edge leaves an outlet area of at least 10 mm×20 mm=200 mm² free with respect to the inside of the housing. In this way there is a good air passage cross-section for the air evacuated from outside the flange area of the stack into the inside of the housing; that is to say there is a sufficient outlet area for the respective suction groove below or inside the housing with respect to the end plate.

The "maximum height of the flange area" is understood to be the height when the container stack is completed. The device works satisfactorily when the length of the suction groove is at least equal to this maximum height of the flange area of the container stack.

The invention is configured in a particularly advantageous manner in that the inside wall of the housing surrounding the cavity has a length in the longitudinal direction of the cavity, at its external end outside the suction groove, which is at least equal to the height of the flange of the cup-shaped container. This results in a very good seal, as then the flange of the cup-shaped container forms a radial sealing lip. The "height" of the flange of the cup-shaped container can also be understood as its thickness or its size. If the cup-shaped container is viewed in a longitudinal section, which passes centrally through the longitudinal axis, the thickness or height of this flange is in the longitudinal direction of the container. If in the case of a cup-shaped container with a round cross-section, with rotational symmetry, the annular external surface of the flange lies against a corresponding annular surface of the internal wall of the housing surrounding the cavity, then the flange of the cup-shaped container can lie against this inside wall and act as a radial sealing lip. If the internal wall of formed by a guide bush, as described above, and if the guide bush is provided with a holding flange, the insertion of the cup-shaped containers to be stacked can be made easier in that this holding flange is chamfered internally. Such a chamfer makes the threading in and centring of containers to be stacked more easy. Care must be taken in the sense of the latterly described measure according to the invention that the chamfer of lead-in slope does not interrupt, shorten or lift the annular surface of the internal wall of the housing or the internal wall of the guide bush, so that the flange of the container can still be laid, as a radial sealing lip, against a corresponding annular surface.

It is advantageous according to the invention when the base of the cavity is provided with at least one gas passage aperture, preferably configured as an annular gap between the cavity and an ejector which can be moved relative to the base of the cavity. In a first embodiment without an ejector, it is advantageous to provide at least one gas passage aperture in the base of the cavity, so that the first, outer container of the stack can lie well and flush on the cup-shaped internal wall of the cavity in that gas or air between the cavity and the external surface of the container to be stacked can be removed by means of the gas passage aperture described. The low pressure is brought to the external surface of the flange area of the container stack via the gas outlet channel, whereby the air between all the stacked containers can be evacuated; and with the aid of the aperture in the cavity base the first, outer container of the stack especially can be laid on the cavity.

When advantageously an embodiment with a central ejector is used, the ejector itself forms a part of the cavity base, wherein a preferably more narrow annular gap between the cavity and ejector forms the aperture for the passage of the gases.

By evacuating the gas from the cavity through the gas outlet aperture, an adhesion effect is produced between the internal wall of the cavity and the external surface of the first cup-shaped container, which is restricting when the stack is removed and dispensed from the cavity. In order to disrupt the adhesion effect, on the one hand a shot of compressed air is exerted upon the stack through a gas outlet aperture in the ejector and from outside the housing, and at the same time on the other hand the ejector is driven against the stack in order to also push it out of the cavity mechanically.

In an advantageous further embodiment of the invention, the combination of the materials of the internal wall of the housing surrounding the cavity, and the external surface of the cavity is selected such that during their relative movement they do not tend to seize. In this way the cavity remains reliably moveable relative to the internal wall of the housing and the internal wall of the guide bush. Brass/bronze on the one hand and steel on the other hand can be considered as combinations of metals. However, a plastics bush or a guide bush coated with plastics could also be used. Successful tests have also been carried out with a steel on steel combination of materials, wherein in this case the guide bush manufactured from steel also had suction grooves, but these were open towards the interior of the housing, that is to say they had no internal terminal edges. The suction groove, also closed on the side inside the housing in the other embodiment described, permits the construction of a longer guide bush in the inside of the housing as well, which should be considered for production reasons and offers advantages for the mechanically engineered manufacture of the guide bush.

It is furthermore advantageous according to the invention when the driving means for the cavity are accommodated in the internal space of the housing, and when preferably the internal space has a low pressure with respect to the space outside the housing. In this case the atmospheric outside air presses into the inside of the cup-shaped container currently inserted in the cavity, and presses it against the cup-shaped wall of the cavity; and on the other hand the air between the stacked containers can be evacuated from outside the housing, in the flange area thereof, so that one side wall of the cup-shaped container can lie closely on the next and thereby a stack of a large number of containers can be formed, with low total geometric expansion. A vacuum of 0.05 bar to 0.3 bar less than atmospheric pressure is preferably selected as the low pressure, preferably 0.2 bar less than atmospheric pressure. This so-called vacuum can be constantly maintained during the whole movement inwards of the cavity into the housing. The driving means can naturally also operate in such a vacuum. Sealing means do not have to be provided between the guide bush and the cavity as both are located in the interior of the housing, which has been evacuated. In order to satisfy the hygiene requirements described above, when containers for the food industry have to be processed, all the air blown in is advantageously extremely finely filtered. The air of the so-called atmosphere should not be unconditioned then, but instead be extremely finely filtered.

A preferred embodiment of the invention is characterised in that the aperture of the cavity is movable in the direction towards the inside of the housing in an area which lies in the effective area of the suction groove, that is to say between the top and bottom terminal edges thereof.

After placing the flange of the first, outermost cup-shaped container of a stack on the aperture of the cavity, the cavity is moved down by one step, the so-called indexing distance, in the direction towards the inside of the housing. When the next container is inserted, the aperture of the cavity consequently moves down by a further indexing distance towards the inside of the housing. When at last, after completion of the stack, the maximum height of the flange area is reached, the aperture of the cavity is located in its terminal position. When this terminal position lies in the area of the terminal edge of the suction groove, on the side facing the inside of the housing, or for example somewhat above or below it, then a good cross-section is obtained for the emerging air evacuated from the external surface of the flange area of the stack. In spite of the radial sealing lip of the respective container flange described above, a continuous leakage flow cannot be prevented. For this, a sufficient suction cross-section must be provided, and this is done by means of the measures hereinabove together with special configurations such as, for example, the use of the suction groove up to the level of the cavity aperture.

Whether the guide bushes and the housing are composed of a single piece in a first embodiment, or in a second embodiment are separate parts fixed to one another, in both cases only the cavity is movable relative to the internal wall surrounding it. Between the external surface of the cavity and the internal wall of the housing or guide bush, there is therefore some clearance, that is to say the external diameter of the cavity is somewhat smaller than the internal diameter of the housing or the guide bush. In a preferred embodiment the fit is H8/e8.

The principle of the invention is directed to the extraction of air from the space between the containers to be stacked on the one hand, and the cavity on the other hand, and respectively between the cup-shaped containers inserted one inside another; wherein preferably both types of space are evacuated. For both the gas outlet channel which was described and explained first and the gas passage aperture which was described with reference to the cavity base, there is the goal that according to the invention as large a passage cross-section as possible is provided. While this is less critical for the cavity base, limits are set for the gas outlet channel in the area of the internal wall of the housing. In the preferred embodiment with the guide bush, the limit is predetermined, for example, by the thickness of the material of the bush. In order to increase a passage, the suction groove could be made very large, so that the guide bush is manufactured very thick, that is to say its wall thickness is made large. When, on the other hand, numerous holes with guide bushes have to be provided in a compact housing for producing several adjacent stacks, the wall thickness of the guide bushes cannot be arbitrarily thick. Instead, a sufficient area of support for the receiving, guiding and holding done by the cavities must be present so the width of the grooves also cannot be increased arbitrarily. However, between the limits indicated there are large areas of application. With preferred embodiments, the guide bush already described, with, for example, four suction grooves, was sufficient. With a distance of approximately 10 to 15 mm apart of the side walls from one another, 38 holes were provided in an end plate of a housing and correspondingly 38 cavities. This embodiment works very satisfactorily.

Figure 7:
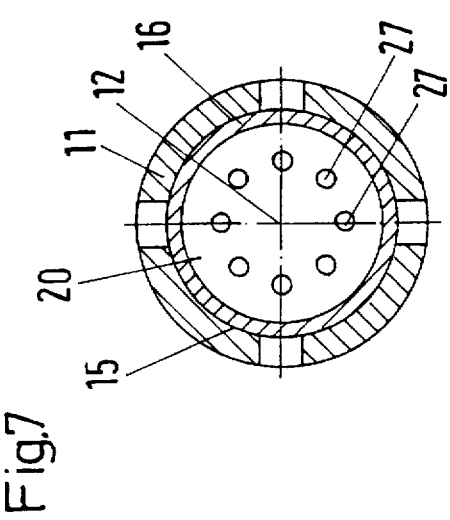

Further advantages, features and possibilities for application of the present invention will be evident from the following description of preferred embodiments with reference to the attached drawings. These show in:

FIG. 1 a densely packed stack of cup-shaped containers, seen from the side, wherein the so-called flange area lies at the top, FIG. 2 a cross-section view through the stack according to FIG. 1 along the line II—II, FIG. 3 a gas-tight housing shown broken and cut away, with an end plate lying above and three adjacent holes, each with a guide bush and a cavity with an ejector, each in a different operating position, FIG. 4 a cross-section view through a station, the station arranged on the right in FIG. 3, along the line IV—IV, FIG. 5 an enlarged detail of the hatched circle V in FIG. 3, FIG. 6 the end plate of a housing, shown broken and cut away, of a second embodiment with two stations with different cavities compared to the first one, and FIG. 7 a cross-section view along the line VII—VII of FIG. 6.

The stack 31 shown in FIGS. 1 and 2 is composed of cup-shaped containers 6 coaxially inserted one inside another, each with a side wall 32, on one end of which a base 33 is arranged and on the other end a flange 1. A distinction is made between an inner cup-shaped container 2 and the first outer cup-shaped container 4.

The flanges 1, and thereby the cup-shaped containers 2, 4 and 6 are located in the completed stack 31 shown in FIGS. 1. The small distance apart of the flanges 1 corresponds at the same time to the indexing distance and is labelled i in FIG. 1. In a preferred embodiment it is between 0 and 5 mm.

The outer cup-shaped container is in a non-folded state, which corresponds at the same time to the expanded state or state as manufactured. The degree of folding corresponding to the longitudinal folds 3 increases towards the inside with the increasing number of containers inserted one inside another. This can be seen clearly in the cross-section view according to FIG. 2. Nevertheless, even the inner folded cup-shaped container is folded without twisting, bending or distortion, in particular when the example of a flexible plastics material is considered.

When a controlled spacing, for example in the sense of the distance i, is necessary to give the stack 31, for example, a tidy or neat appearance, or in order to make possible the gripping of the flange 1 of an inner, folded cup-shaped container 2 manually or with a special machine, so that this container can be removed easily from the stack 31, a collar 5, is provided on the respective cup-shaped container 2, 4, 6 for example as a de-stacking collar.

FIG. 2, which shows the cross-section view of the stack 31 along the line II—II of FIG. 1, shows with the first, outer cup-shaped container 4, the non-folded state which can be recognised from the line, circular in cross-section, which represents the side wall. This is the same as the expanded state or the state as manufactured of the cup-shaped container 4. Further inside a cup-shaped container 2 can be seen, in its folded state. The shape of the side wall 32 in the cross-section according to FIG. 2 changes from the generally circular shape of the outer container 4 to the corrugated shape according to the innermost line, with the longitudinal folds 3. The view is in the direction of the longitudinal folds. The surface of the side wall 32 can be described as limp, with a certain degree of stiffness. The individual longitudinal folds 3 can also be described as corrugations. In FIG. 2, four corrugations have occurred because of the folding. Between the individual side walls 32 of the containers 2, 4, the air space 7 can be seen in FIGS. 1 and 2. The goal of the device according to the invention is to remove as much air as possible from the air spaces 7 between the cup-shaped containers 2, 4, 6.

For this, a stack manufacturing machine is used as shown in a first embodiment in FIGS. 3 to 5 and in a second one shown in FIGS. 6 and 7.

A gas-tight housing generally labelled 8 is provided with an end plate 9, in which holes 10 are arranged adjacently at even distances apart, into which guide bushes 11 are fixed. These are inserted from above in the direction of the longitudinal centre axis 12 into the respective hole 10 so that the holding flanges 13 fixed above or outside the housing to the respective guide bushes 11, are supported on the end plate 9. A chamfer 14 is fitted to form a slope on the holding flange 13. The internal wall 15 of the guide bush 11 is cylindrical and receives, with clearance, a cavity 16, the external surface 17 of which is also cylindrical. The cavity 16 has a cup-shaped internal contour, which corresponds to the external contour of the first, outer container 4 (FIG. 6), which is inserted first into the cavity. By means of driving means, not shown, arranged in the interior of the housing 8, the cavity 16 is intermittently moveable in the longitudinal direction 12, that is to say in the direction of the longitudinal centre axis, which is also at the same time the longitudinal centre axis of the guide bush 11, into the internal space 18 of the housing 8, and in the opposite direction upwards through the respective hole 10 in the direction towards the outside of the housing 8. To improve clarity, in the Figures in the sectional views according to FIGS. 3 and 6, the respective righthand position with the maximum container stack 31 is shown with the assumption that no more than the number of flanges 1 shown can be arranged one above another for forming the flange area 19.

If, in an embodiment not shown, twice as many containers 2, 4, 6 can be stacked one into another, so that the maximum height H of the flange area 19 is twice as great, the maximum lift h is also approximately twice as great.

On the side facing the outside of the housing, the cavity has an aperture 19a (FIG. 5) in which the collar 5 of the outer cup-shaped container 4 lies. Opposite this aperture 19a, which is planar in the embodiment shown here, towards the inside space 18 of the housing, the cavity has a base 20. The aperture 19a facing towards the outside of the housing 8 is partly cylindrical and is finished by a planar annular surface 21 adjacent to the aperture 19a of the cavity. The flange 1 of the first cup-shaped container 4 is laid level on this planar annular surface 21.

In the left-hand initial position I shown in FIGS. 3 and 6, the container flange 1 just inserted is shown on the planar annular surface 21 of the cavity. In this initial position the aperture 19a of the cavity 16 is located at the furthest possible height towards the outside of the housing, the furthest upwards in the embodiment described here, and in particular in the area of the end plate 9; more precisely, a little below the external plane of said end plate 9.

According to an embodiment which is not shown here, the guide bush 11 and the housing 8, and also in particular the end plate 9, can be constructed in one piece. In this case the housing 8 itself would encompass the cavity 16 with its internal wall 15.

In the two embodiments shown here, however, the cavity 16 is encompassed by the internal wall 15 of the guide bush 11. In other words, the internal wall 15 of the housing 8 surrounding the cavity 16 is formed by a guide bush 11 fixed in a sealing manner into the hole 10 in the end plate 9. The guide bush 11 can also be fixed in a sealing manner using O-rings and other sealing means. The guide bush 11 extends from the end plate 9 into the internal space 18 of the housing 8 and has four gas outlet channels 22, which are formed by suction grooves 22'. The suction grooves 22' also extend in the direction of the longitudinal centre axis 12.

It can clearly be seen from the respective right-hand operating position of the cavity 16 according to FIGS. 3 and 6, how the gas outlet channel 22 or the suction groove 22' brings the low pressure in the internal space 18 of the housing 8 to the spaces 23 around the external surface of the container stack 31.

On the side facing the outside of the housing, the suction groove 22' is closed "upwards" in the drawings, so the internal wall 15 of the housing 8 above, outside this suction groove 22' is of a length d in the longitudinal direction, that is to say in the direction of the longitudinal centre axis 12, which is at least equal to the height of the respective upper flange 1 of the cup-shaped container 6. It can be seen in FIG. 5 that in this way the upper flange 1 can lie in a sealing manner as a radial sealing lip against the small piece of internal wall 15 of the guide bush 11.

FIG. 5 also shows the (semi-circular) terminal edge 24 of the suction groove 22', on the side facing the outside of the housing. The opposite, terminal edge 25 of the suction groove 22', on the side facing the inside of the housing, can be seen in FIGS. 3 and 6. The two terminal edges 24 and 25 give the length I of the suction groove 22'. The length 1 of the suction groove 22' towards the inside of the housing 8 is clearly greater than or equal to the maximum height H of the flange area 19 of the completed container stack 31.

The embodiment according to FIGS. 3 and 5 differs from the second embodiment according to FIGS. 6 and 7 in that in the first embodiment the base 20 of the cavity 16 is provided with an ejector 26 moveable relative to the base 20. The clearance between the cavity and ejector serves as a gas passage aperture, which connects the space in the cavity 16 to the internal space 18 of the housing 8.

With the second embodiment according to FIGS. 6 and 7, the base 20 of the cavity 16 is not provided with an ejector, and instead is provided with a ring of gas passage apertures 27. This can be seen particularly clearly in the representation according to FIG. 7.

During operation, the cavity 16 is moved upwards into the initial position I (FIGS. 3 and 6). A cup-shaped container 4 is pushed from above in the direction of the longitudinal centre axis 12 over the lead-in slope 14 into the cup-shaped internal space of the cavity 16 until the flange 1 comes into contact with the planar annular surface 21 of the cavity 16. The initial position I shown in FIGS. 3 and 6 is then reached. Meanwhile, the vacuum has been set at approximately 0.2 bar with respect to the external atmosphere and is continuously maintained. Air found between the internal space of the cavity 16 and the outside surface of the first outer cup-shaped container 4 inserted is removed by means of the annular gap between the cavity 16 and ejector 26 with the embodiment according to FIG. 3, and by means of the ring of apertures 27 with the embodiment according to FIGS. 6 and 7. The side wall 32 and base 33 of the first cup-shaped container 4 lie so well on the internal walls of the cavity 16, that they can hardly be recognised graphically in FIGS. 3 and 6.

After this, the cavity returns downwards by the indexing distance i, this being directly prior to the next container 6 being pushed into the outer container 4. In this way the need to manage over-large leakage flow from the vacuum pump into the internal space 18 of the housing 8 is avoided. By means of the return of the cavity 16 by the respective indexing distance i, from a geometrical point of view the same state as in the initial position I is produced for the arriving cup-shaped containers 6, so the sealing conditions of the flange 1, as radial sealing lips, are always effective in the same advantageous manner (FIG. 5). While the annular gap between the cavity 16 and ejector 26 ensure that air from the space between the inner cup in the cavity 16 and the outside of the first cup-shaped container 4 is pumped out, in the case of all following cup-shaped containers 6, the suction grooves 22' ensure the evacuation of air between the inner surface of the outer container 4 already located in the cavity 16 and the outer surface of the next container 6 which has just been inserted. Here, the space is labelled 23 in FIG. 5, from which, always between two containers 6 inserted one inside another, air from the space 7 shown in FIG. 2 can be extracted.

The effective length of the suction groove increases with the increasing height of the flange area 19 of the container stack 31. The air passage cross-section of the suction grooves 22' is advantageously designed so that up until the maximum lift h of the cavity 16, sufficient air can be evacuated downwards into the space 18 of the housing 8.

After completion of the container stack 31, the vacuum or the low pressure in the internal space 18 of the housing 8 is switched off, with the embodiment of FIG. 3 a positive shot of pressure created in the internal space of the ejector 26, and then the stack 31 is ejected upwards from the respective cavity 16.

With other embodiments, the supply of compressed air from below is sufficient to lift the whole stack upwards.

I claim:

1. Device for manufacturing a stack (31) of cup-shaped containers (2, 4, 6) coaxially inserted inside another, each with a side wall (32), on one end of which a base (33) is arranged, and on the other end a flange (1), wherein the container (2, 4, 6) is composed of a flexible material and the flange (1) is substantially stiffer than the side wall (32) and the base (33), comprising an end plate (9) of a gas-tight housing (8) there is arranged, in a driveable manner, at least one cup-shaped cavity (16) intermittently moveable in a longitudinal direction (12) of the latter up to a maximum lift (h) which is equal to the maximum height (H) of a flange area (19) of the container stack (31), that an aperture (19a) of the cavity (16) is configured and arranged for level receipt and installation of the flange (1) of a first, outer container of the stack, and in an initial position (I) before the first movement, is arranged in the area of the end plate (9), accessible from outside the housing (8), while the base (20) of the cavity (16) located opposite the aperture (19a) is arranged facing towards an internal space (18) of the housing (8), and that in an internal wall (15) of the housing (8) at least partially surrounding a cylindrical external surface (17) of the cavity (16) there is provided at least one gas outlet channel (22), which connects a space (23) around the external surface of the container stack (31) with the internal space (18) of the housing (8).

2. Device according to claim 1, wherein the external surface (17) of the cavity (16) as well as the at least partially surrounding internal wall (15) are formed with a circular, oval or polygonal cross-section, according to the flange shape of the container (2, 4, 6).

3. Device according to one of claims 1 to 2, wherein the gas outlet channel (22) is formed by a suction groove (22') closed towards the outside of the housing (8), extending in the longitudinal direction (12) of the cavity (16).

4. Device according to one of claim 3, wherein the length (1) of the suction groove (22') towards the inside of the container (8) is at least equal to the maximum height (H) of the flange area (19) of the container stack (31).

5. Device according to claim 3, wherein the internal wall (15) of the housing (8) surrounding the cavity (8), on its outside end outside the suction groove (22') is of a length (d) in the longitudinal direction (12) of the cavity (16) which is at least equal to the height of the flange (1) of the cup-shaped container (2, 4, 6).

6. Device according to claim 1 or 2, wherein the internal wall (15) of the housing (8) surrounding the cavity (16) is formed by a guide bush (11) fixed in a sealing manner in an aperture (10) in the end plate (9), which extends from the end plate (9) into the internal space (18) of the housing (8), and is provided with the gas outlet channel (22).

7. Device according to one of claims 1 to 2, wherein the internal contour of the cavity (16) corresponds to the external contour of the first, outer container (4) of the stack (31).

8. Device according to one of claims 1 to 2, wherein a base (20) of the cavity (16) is provided with at least one gas outlet channel (27), preferably configured as an annular gap between the cavity and an ejector (26) moveable relative to the base (20) of the cavity.

9. Device according to one of claims 1 to 2, wherein the pairing of the materials of the internal wall (15) of the housing (8) surrounding the cavity (16) and of the external surface (17) of the cavity (16) is selected such that they do not tend to seize during their relative movement.

10. Device according to one of claims 1 to 2, wherein the driving means for the cavity (16) are accommodated in the internal space (18) of the housing (8), and that preferably the internal space (18) has a low pressure (Δp) with respect to the space outside the housing (8).

11. Device according to one of claims 1 to 2, wherein the aperture (19a) of the cavity (16) is moveable in the direction towards the inside of the housing (8) in an area in which the terminal edge (25) of the suction groove (22') arranged furthest towards the inside of the housing (8) lies in the guide bush (11).

* * * * *

UNITED STATES PATENT AND TRADEMARK OFFICE
CERTIFICATE OF CORRECTION

PATENT NO. : 5,797,720
DATED : August 25, 1998
INVENTOR(S) : Michael Ruh

It is certified that error appears in the above-identified patent and that said Letters Patent is hereby corrected as shown below:

Col. 8, line 45 "11-II" should be --II-II--;
Col. 12, claim 4, line 1 "one of claim 3" should be --claim 1--;
    claim 5, line 1, "3" should be --4--.

Signed and Sealed this

Thirteenth Day of April, 1999

Attest:

Q. TODD DICKINSON

*Attesting Officer*     Acting Commissioner of Patents and Trademarks